United States Patent
Dubois et al.

(10) Patent No.: US 10,984,131 B2
(45) Date of Patent: Apr. 20, 2021

(54) METHOD FOR PROVIDING PERSONAL INFORMATION OF A USER REQUESTED BY A GIVEN ONLINE SERVICE

(71) Applicant: ORANGE, Paris (FR)

(72) Inventors: Pierre-Francois Dubois, Sceaux (FR); Javier Polo Moragon, Yecla (ES); Serge Llorente, Chatillon (FR)

(73) Assignee: ORANGE, Paris (FR)

( * ) Notice: Subject to any disclaimer, the term of this patent is extended or adjusted under 35 U.S.C. 154(b) by 410 days.

(21) Appl. No.: 16/305,618

(22) PCT Filed: May 24, 2017

(86) PCT No.: PCT/FR2017/051302
§ 371 (c)(1),
(2) Date: Nov. 29, 2018

(87) PCT Pub. No.: WO2017/207894
PCT Pub. Date: Dec. 7, 2017

(65) Prior Publication Data
US 2020/0193052 A1    Jun. 18, 2020

(30) Foreign Application Priority Data
May 30, 2016    (FR) ...................................... 1654836

(51) Int. Cl.
| | |
|---|---|
| *G06F 21/35* | (2013.01) |
| *H04L 29/06* | (2006.01) |
| *G06F 21/62* | (2013.01) |
| *G06F 16/23* | (2019.01) |

(Continued)

(52) U.S. Cl.
CPC ............ *G06F 21/6245* (2013.01); *G06F 9/54* (2013.01); *G06F 16/2379* (2019.01); *G06Q 50/265* (2013.01); *H04L 63/105* (2013.01)

(58) Field of Classification Search
None
See application file for complete search history.

(56) References Cited

U.S. PATENT DOCUMENTS 8,156,543 B2 * 4/2012 Wentker ............. H04L 63/0884
726/3
9,692,754 B2 * 6/2017 Genestier ............. H04L 63/123
(Continued)

FOREIGN PATENT DOCUMENTS

WO    2012040198 A1    3/2012

OTHER PUBLICATIONS

International Search Report dated Aug. 25, 2017 for International Application No. PCT/FR2017/051302 filed May 24, 2017.
(Continued)

*Primary Examiner* — Fatoumata Traore
(74) *Attorney, Agent, or Firm* — David D. Brush; Westman, Champlin & Koehler, P.A.

(57) ABSTRACT

A method for providing personal information of a user requested by a given online service. The method includes, by a security server of a mobile terminal operator of be user: (a) receiving a request for the personal information, including comprising a unique identifier of the user and an identifier of the online service; (b) sending, to the mobile terminal, a response authorisation request; (c) if a response authorisation confirmation is received, sending data, which is associated in a database with the unique identifier and the identifier of the online service. Each pair of a unique identifier and an online service identifier is also associated in the database with a parameter representative of a level of security required in order to confirm the response authorisation on the mobile terminal. The step (b) includes: determining the value of the parameter; and integrating the determined value in the response authorisation request.

10 Claims, 1 Drawing Sheet

(51) Int. Cl.
  *G06F 9/54* (2006.01)
  *G06Q 50/26* (2012.01)

(56) References Cited

U.S. PATENT DOCUMENTS

| | | | | |
|---|---|---|---|---|
| 2007/0288394 | A1* | 12/2007 | Carrott | G06Q 20/12 705/78 |
| 2013/0273882 | A1* | 10/2013 | Walsh | G06Q 20/102 455/407 |
| 2015/0039728 | A1* | 2/2015 | Virieux | H04L 67/02 709/219 |

OTHER PUBLICATIONS

Written Opinion of the International Searching Authority dated Aug. 25, 2017 for International Application No. PCT/FR2017/051302 filed May 24, 2017.

English Translation of the Written Opinion of the International Searching Authority dated Aug. 31, 2017 for International Application No. PCT/FR2017/051302 filed May 24, 2017.

Shah Yogendra et al., "Multi-factor Authentication as a Service", 2015 3rd IEEE International Conference on Mobile Cloud Computing, Services, and Engineering, IEEE, Mar. 30, 2015 (Mar. 30, 2015), pp. 144-150, XP032789428.

Maachaoui Mohamed et al., "Virtual walled-garden model for IMS services provisioning", 2013 National Security Days (JNS3), IEEE, Apr. 26, 2013 (Apr. 26, 2013), pp. 1-6, XP032480318.

Watanabe R et al., "Federated Authentication Mechanism using Cellular a Phone—Collaboration with OpenID", Information Technology: New Generations, 2009. ITNG 109. Sixth International Conference on. IEEE. Piscataway. NJ. USA. Apr. 27, 2009 (Apr. 27, 2009). pp. 435-442, XP031472297.

French Search Report dated Feb. 9, 2017 for corresponding French Application No. 1654836, filed May 30, 2016.

* cited by examiner

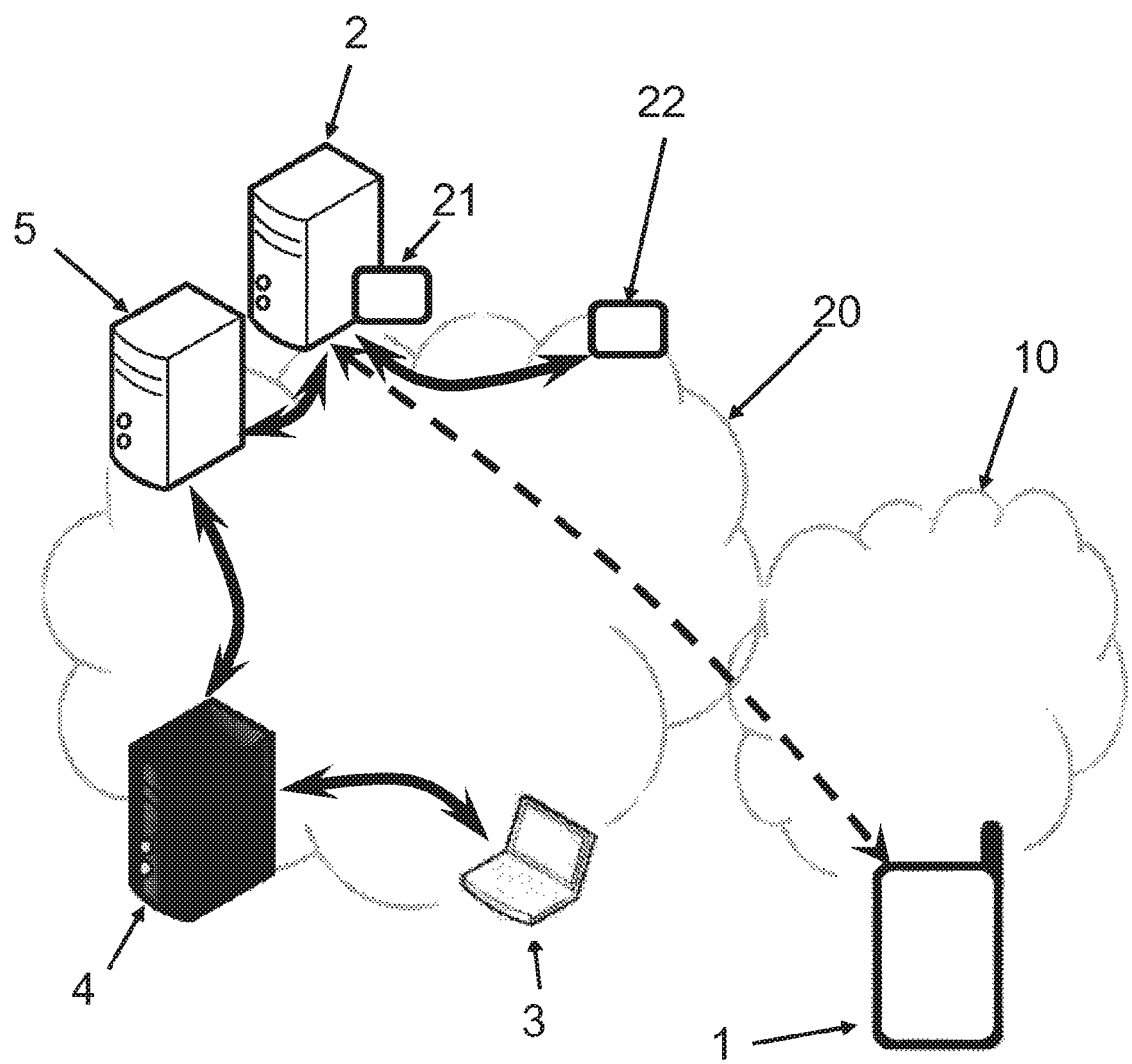

METHOD FOR PROVIDING PERSONAL INFORMATION OF A USER REQUESTED BY A GIVEN ONLINE SERVICE

CROSS-REFERENCE TO RELATED APPLICATIONS

This Application is a Section 371 National Stage Application of International Application No. PCT/FR2017/051302, filed May 24, 2017, which is incorporated by reference in its entirety and published as WO 2017/207894 A1 on Dec. 7, 2017, not in English.

GENERAL TECHNICAL FIELD

The present invention relates to the field of authentication via mobile terminal.

More precisely, it relates to a method for recovering personal data of the user for the purpose of providing an online service.

PRIOR ART

"Mobile Connect" technology, developed by the Applicant, aims to make it possible to authenticate a user to an online service via a mobile terminal.

More precisely, instead of entering a login/password pair on a portal of an online service (a webpage), the user selects the MC (Mobile Connect) option and he is simply asked to input a personal identifier (which may be his telephone number or an anonymized "alias").

The online service then requests, possibly via an API (Application Programming Interface) platform, from an MC server of the telephone operator of the user, the associated personal information (in this case the login and the password).

The MC server, before interrogating a database storing the personal information of the users in encrypted form so as to return the requested information, sends a validation request to the mobile terminal of the user. An MC application opens on the mobile terminal and invites the user to accept the request. If he does, the MC server returns the requested personal information so as to allow the user to access the service.

Patent application EP2629553 describes such a mechanism for authentication via mobile terminal.

This technology is satisfactory because it avoids the user having to remember tens of passwords for various online services. One solution would be to use the same password for everything, which could prove risky if one of the services were to exhibit a flaw. Mobile Connect technology thus improves online security in fine.

At present, user validation in terms of the MC application is simply an "OK" from the user, that is to say pressing a button within a predetermined period.

It would be possible to modify the application so as to provide an additional security level for authenticating the user (so as to avoid a malicious third party who has stolen the mobile terminal from performing the operation), for example by requesting the inputting of a PIN code by the user, or even by asking a secret question or else by requiring biometric identification (many mobile terminals have a fingerprint reader), and even a combination of several authentication mechanisms.

This could prove desirable for accessing "sensitive" online services (for example banking services), but unnecessarily burdensome in other cases where this would stifle any benefit for technology that is aimed above all at simplifying the user's life.

Moreover, the concept of "sensitivity" of a service is subjective: for one user, the security of a given online service may be critical, and for another user flexibility may take precedence.

It would therefore be desirable to have an expedient mechanism allowing the user to find a compromise between security and flexibility, and to do so without sacrificing the overall security of mobile authentication technology.

PRESENTATION OF THE INVENTION

The present invention thus relates, according to a first aspect, to a method for providing personal information of a user requested by a given online service, the method comprising the implementation, by a data processing module of a security server of an operator of a mobile terminal of the user, of steps of:
  a) receiving a request for said personal information of the user, comprising a unique identifier of the user and an identifier of said given online service;
  b) sending, to said mobile terminal of the user, a request to authorize response to said request for said personal information of the user;
  c) if there is reception of a response authorization confirmation from said mobile terminal, sending, in response to said request for said personal information of the user, data associated with said unique identifier of the user and identifier of said given online service in a database stored in a data storage module;
characterized in that each pair of a unique identifier and of an identifier of an online service is also associated, in said database, with a parameter representative of a security level required to confirm the response authorization on said mobile terminal, step (b) comprising:
  determining the value of said parameter, which value is associated, in said database, with said unique identifier of the user and identifier of said given online service; and
  integrating the determined value of the parameter into said request to authorize response to said request for said personal information of the user.

The use of a dedicated parameter for setting a security level allows the user himself to define, on a service-by-service basis and in a personalized manner, the validation procedures that he wishes to implement to authorize the provision of information, so as to optimally adjust security and flexibility.

According to other advantageous and nonlimiting features:
  the value of said parameter representative of a security level is chosen from a predetermined and hierarchized list of security level values.
  said predetermined list comprises at least a first security level in which a manipulation of an interface of the mobile terminal is enough to confirm the response authorization; and a second security level in which it is necessary to input an authentication code on an interface of the mobile terminal to confirm the response authorization;
  the method comprises a preliminary step of:
    receiving, from the mobile terminal (1), a request to modify the value of said parameter, comprising the unique identifier of the user, the identifier of said given online service and the modified value of said parameter;

replacing, in said base, the value of the parameter, which value is associated with said unique identifier of the user and identifier of said given online service, with said modified value.

said given online service is hosted by a third-party server connected to the security server via the Internet;

step (a) comprises a request, by the third-party server to an API platform also connected to the Internet, to provide said personal information of the user, said API platform generating said request for said personal information of the user;

said request by the third-party server to an API platform to provide said personal information of the user is sent upon instructions from the user on an apparatus via which the user is seeking to access said online service.

The method comprises a preliminary step of:

receiving, from the third-party server, a request to modify the value of said parameter, comprising the identifier of said given online service and the modified value of said parameter;

replacing, in said base, the value of the parameter, which value is associated with each combination of a unique identifier and of the identifier of said given online service, with said modified value.

the replacement is implemented only if the modified parameter value corresponds to a security level higher than the initial value;

at the end of step (b), the mobile terminal sends, in response to the response authorization request, the response authorization confirmation if the user implements a validation procedure dependent on said value of said parameter.

According to a second aspect, the invention relates to a security server for providing personal information of a user requested by a given online service, the user having a mobile terminal of an operator, the method comprising the implementation, by a data processing module of the server, of:

a module for receiving a request for said personal information of the user, comprising a unique identifier of the user and an identifier of said given online service, pairs of a unique identifier and of an identifier of an online service being associated, in a database stored in a data storage module, firstly with personal information and secondly with a parameter representative of a security level required to confirm a response authorization on said mobile terminal;

a module for determining the value of said parameter, which value is associated, in said database, with said unique identifier of the user and identifier of said given online service;

a module for sending, to said mobile terminal of the user, a request to authorize response to said request for said personal information of the user, the determined value of the parameter being integrated into said response authorization request;

a module for sending, in response to the request for said personal information of the user, if there is reception of a response authorization confirmation from said mobile terminal, data associated with said unique identifier of the user and identifier of said given online service in said database.

According to a third aspect, there is proposed a system comprising a security server according to the second aspect and a mobile terminal configured to implement a module for sending, in response to the response authorization request, the response authorization confirmation if the user implements a validation procedure dependent on said value of said parameter.

According to a fourth aspect, the invention relates to a computer program product comprising code instructions for executing a method according to the first aspect of the invention for providing personal information of a user requested by a given online service.

According to a fifth aspect, the invention relates to a storage means able to be read by a computer apparatus on which this computer program product is situated.

PRESENTATION OF THE FIGURES

Other features and advantages of the present invention will emerge upon reading the following description of one preferred embodiment. This description will be given with reference to the single appended FIGURE, which is a diagram of a general network architecture for implementing the invention.

DETAILED DESCRIPTION

Architecture

With reference to FIG. 1, the invention proposes a method for providing personal information of a user requested by a given online service.

In other words, it will be understood that the online service requests personal information of the user (typically fields to be filled in) which may be of varying nature: this information preferably comprises a login and/or a password of the user for this online service, but it may involve for example automatically providing the address of the user, his date of birth, etc. in a form.

Online service is understood to mean any third-party service that the user wishes to use, typically via a web portal displayed on a computer apparatus 3 of the user (such as a PC connected to the Internet 20) on which the inputting of personal information is requested. It will be noted that the apparatus 3 may be the same as the mobile terminal 1 that will be described further on. By way of example, reference will be made to an online bank, an e-commerce site, an administrative service, a forum, an online game, etc.

The online service is typically hosted by a server 4 connected to the network 20. It is noted that a plurality of online services may be involved in the present method.

Like in the known Mobile Connect technology, at least one security server 2 is also connected to the network 20. As will be seen, this is a server of an operator of a mobile terminal 1 of the user. It comprises a data processing module 21, for example a processor, and a data storage module 22, such as a hard disk, storing a database in which said personal data are situated, in particular the personal data of a plurality of users (sharing the same mobile telephone operator) for a plurality of online services. The structure of this database will be seen further on.

It is noted that the data storage module 22 may be separate from the server 2 and only connected thereto via the network. It may also be not be a single database, but be distributed between various apparatuses. In any case, the database is preferably encrypted and under the control of the server 2 so as to avoid security flaws.

An API platform 5 is preferably also connected to the network 20. According to one preferred embodiment, it is the same as the security server 2. It will be understood that it may also be integrated into a server hosting the online service.

This API platform 5 forms the link between the servers of the online services and the security server 2. More precisely, in the event of a request for personal information from an online service, it is capable of identifying (according to the operator) and of activating the server 2 by generating an appropriate request. Similarly, in the event of providing personal information in response by the server 2, it is capable of "providing information for" the online service by simulating the inputting of this information by the user on the interface of the online service.

Lastly, the user is equipped with a mobile terminal 1, which may be of any type, in particular a smartphone or touchscreen tablets. It comprises a data processing module (a processor), advantageously a data storage module 12, and a user interface (HMI) comprising for example input means and display means (for example a touchscreen; other alternatives will be seen further on).

The mobile terminal 1 is advantageously connected to a mobile communication network 10, which is itself connected to the Internet 20. It should be noted that the mobile terminal 1 may be connected directly to the Internet 20, for example using Wi-Fi.

The data processing module of the terminal 1 is designed to implement an application (of the type of the MC application outlined above for validating authorizations to provide personal information), the operation of which will be seen in greater detail further on.

Preferably, the terminal 1 furthermore comprises a security element. This is an element designed to authorize connection of the terminal 1 to a mobile communication network, in particular a subscriber identity card. "Subscriber identity card" is understood to mean any integrated circuit capable of providing the functions of identifying a subscriber to a network via data that are stored therein, and more particularly a "SIM" ("Subscriber Identity Module") card or an "e-UICC" ("(embedded)-Universal Integrated Circuit Card") card comprising data processing means in the form of a microcontroller and "EEPROM" (for open "Electrically Erasable Programmable Read-Only Memory") or flash memory. In another exemplary embodiment, the security module 12 is a secure memory area of the mobile terminal, such as a "TEE" ("Trusted Execution Environment") component embedded in the data processing module, or a dedicated hardware element of the terminal 1 (for example a microcontroller, an "eSE" ("(embedded)-Secure Element") chip or any "Secure Component GP (GlobalPlatform)"), or even a removable component of microSD ("SD" for "Secure Digital") type.

Preferably, this security module stores a fraction of said database, in this case the fraction in relation to the personal information of the user of the terminal 1 in question. This ensures maximum security for the information of the user.

Similarly, the security server 2 may be hosted by this security module (with regard to the user involved), the API platform 5 thus having the role of directly contacting each security module (i.e. the mobile terminals 1 of the users directly) if their personal information is requested. To the extent that a security module such as a SIM card is completely locked, this prevents hacking and theft of information.

In the remainder of the present description, the example shown in FIG. 1 of a centralized storage module 22 will be taken, but a person skilled in the art will know how to transpose the invention in the case of the use of a storage module of the terminal 1 for storing the personal information.

Method

In a known manner, the method for providing personal information of a user requested by a given online service, the method comprising the implementation, by a data processing module 21 of a security server 2 of an operator of a mobile terminal 1 of the user, of three steps of:

a) receiving a request for said personal information of the user, comprising a unique identifier of the user and an identifier of said given online service;

b) sending, to said mobile terminal 1 of the user, a request to authorize response to said request for said personal information of the user;

c) if there is reception of a response authorization confirmation from said mobile terminal 1, sending, in response to the request for said personal information of the user, data associated with said unique identifier of the user and identifier of said given online service in a database stored in a data storage module 22.

In other words, the server 2 has to be asked directly or indirectly by the given service to initiate the method.

To this end, in one preferred example, the user seeks to access the online service on the apparatus 5 and, to this end, the third-party server 4 hosting said service asks him to provide personal information.

The user may simply provide this information himself, but instead he sends instructions to resort to mobile authentication, i.e. to request the provision of this personal information via the network 20, for example by ticking an appropriate box on the portal of the service displayed via the apparatus 3. At this juncture, the user has to provide at least, in particular through an input, his unique identifier (it should be noted that it may for example be recorded beforehand by an application, such as a browser, of the apparatus 3). As explained, this personal identifier may be either directly an email address or even the telephone number of the mobile terminal 1 of the user, or an "alias", that is to say an anonymized identifier (such as a code or a pseudonym) if the user wishes to avoid giving information such as his telephone number to the service.

As a result (following the instructions from the user), step (a) then comprises a request, by the third-party server 4 to the API platform 5 that is also connected to the Internet 20, to provide said personal information of the user.

In other words, the server 4 asks said API platform 5 to generate said request for said personal information of the user. To this end, it transmits to it the received unique identifier of the user along with an identifier of the service (or means for recovering this identifier). The list of requested information may also be included.

As explained, it will be understood that the server 4 may have the capabilities of the API platform 5 and therefore directly generate the request for the security server 2.

Upon reception of the request, the server 2 has all of the elements allowing it to recover and provide the personal information of the user, but beforehand it will verify, via his mobile terminal, that the user that requested the automatic provision is actually the expected user.

To this end, in step (b), it generates the second request to authorize response to said request for said personal information of the user, and sends it to said mobile terminal 1 of the user. In other words, it asks the user to validate, via his terminal, the transfer of the requested personal information.

Said second request may comprise the identifier of the requesting service. Upon reception of this request, the mobile terminal 1 displays that the personal information of the user is about to be provided (where applicable, the requesting service is displayed so as to assist the user), and the user uses the interface of his terminal to validate or not to validate this authorization; we will see how further on.

A response authorization confirmation is then sent by the terminal 1 and received by the server 2, and the latter may then send, in response to the request for said personal information of the user, the data (which are the personal information) associated with said unique identifier of the user and identifier of said given online service in the database stored in a data storage module 22, or at least those requested (for example the login/password pair of the user for this service).

Database

The present method is distinguished inter alia by a particular structure of the database.

Where it is known to associate a pair {unique identifier, identifier of a service} with each set of personal data, the present method uses a third parameter, representative of a security level required to confirm the response authorization on said mobile terminal 1. In other words, each set of personal data is associated with a triplet {unique identifier, identifier of a service, security level}.

More precisely, the validation procedure to be implemented by the user on his mobile terminal 1 (to confirm the authorization to respond to the first request) depends on the value of this parameter representative of a security level, that is to say that the mobile application implements different validation procedures depending on the value of this parameter, these various validation procedures corresponding to different security levels.

Preferably, the value of said parameter representative of a security level is thus chosen from a predetermined and hierarchized list of security level values: level 1, level 2, level 3, etc. (where level i is representative of a lower security level than level j if i<j).

The idea is that, the higher the security level, the more complex the validation procedure and the more it requires "strong" authentication of the user on the mobile terminal 1, and therefore the more his identity is guaranteed, but the more cumbersome the procedure. By contrast, a low security level may exhibit flaws, but allows a simple validation procedure, that is to say one that is very unobtrusive and lightweight. This allows, as will be seen, modularity of the security level and a new paradigm in which it is the user who defines, on a case-by-case basis, his security, without it being the service provider that imposes this, as has always been the case up until now.

Particularly preferably, said predetermined list comprises at least a first security level in which a manipulation of an interface of the mobile terminal 1 is enough to confirm the response authorization (in other words, the validation procedure consists in accomplishing a given manipulation of the interface of the mobile terminal 1); and a second security level in which it is necessary to input an authentication code on an interface of the mobile terminal 1 to confirm the response authorization (in other words, the validation procedure comprises at least the inputting of the authentication code on the interface of the mobile terminal 1).

"Manipulation of an interface" is understood to mean any predetermined action, such as pressing a button or clicking on a predetermined area (or touching it in the case of a touchscreen terminal). For example, pressing "OK". A touch movement such as "slide to unlock" may be contemplated. Generally speaking, this is a simple validation signifying that the user is present on the mobile terminal 1. In other words, no code or no knowledge of a particular secret item of information is necessary for this validation at security level 1.

If the user does not accomplish said manipulation within a predetermined period (or performs another one representative of denial of authorization, such as pressing "CANCEL"), then the validation procedure is not implemented correctly, authorization is deemed not to be confirmed and the method stops.

Validation at security level 2, for its part, requires knowledge of a secret item of information, in this case said required authentication code. This is typically the PIN code, but this may be for example an unlocking pattern.

Security levels beyond this may be contemplated. For example, a security level 3 may require an item of information that is not able to be known or stolen, such as a biometric item of information. The validation procedure is then the verification of a fingerprint, of a retina scan, etc.

A security level 4 may combine a plurality of biometric and/or secret items of information, etc.

Regardless of the provided security level values, step (b) provides for the implementation, by the data processing module 21 of the security server 2, of two innovative sub-steps, in this case:
  determining the value of said parameter, which value is associated, in said database, with said unique identifier of the user and identifier of said given online service; and
  integrating the determined value of the parameter into said request to authorize response to said request for said personal information of the user.

In other words, when the server 2 receives the first request, it interrogates the database in order to ascertain the value of the third parameter in the triplet {unique identifier, identifier of a service, security level} and it integrates this parameter value into the second request sent to the mobile terminal 1 (where applicable with the identifier of the service).

Plus, the mobile terminal 1 requests confirmation of the authorization to respond to the first request in accordance with the security level corresponding to this parameter, such that, for this given online service, security is as the user has defined it, typically at level 1 (simple validation with "OK") for basic online services, and level 2 or more (validation with an authentication code or even biometrics) for more critical services such as banking services.

To sum up, the present method for providing personal information of a user requested by a given online service comprises the implementation, by a data processing module of a security server 2 of an operator of a mobile terminal 1 of the user, of steps of:
  a) receiving a request for said personal information of the user, comprising a unique identifier of the user and an identifier of said given online service, pairs of a unique identifier and of an identifier of an online service being associated, in a database stored in a data storage module 22, firstly with personal information and secondly with a parameter representative of a security level required to confirm a response authorization on said mobile terminal 1;
  b) determining the value of said parameter, which value is associated, in said database, with said unique identifier of the user and identifier of said given online service; and sending, to said mobile terminal 1 of the user, a request to authorize response to said request for said personal information of the user, containing the determined value of the parameter in said response authorization request;

c) if there is reception of a response authorization confirmation from said mobile terminal 1, sending, in response to said request for said personal information of the user, data associated with said unique identifier of the user and identifier of said given online service in said database.

Security Level Modification

As explained, the security level is able to be modulated under the control of the user, so as to change the validation procedure associated with each online service.

To this end, the method advantageously comprises a preliminary step of receiving, from the mobile terminal 1, a request to modify the value of said parameter, comprising the unique identifier of the user, the identifier of said given online service and the modified value of said parameter; and replacing, in said base, the value of the parameter, which value is associated with said unique identifier of the user and identifier of said given online service, with said modified value.

In other words, via the validation application, the user is able to parameterize his security levels. Thus, the application is able to display the security level associated with each online service, and the user is able to modify it directly by requesting sending of the request to modify the value of said parameter.

Preferably, only upward modification is possible, that is to say that the replacement (of the initial value with the modified value) is implemented only if the modified parameter value corresponds to a security level higher than the initial value.

For example, a change from security level 1 (simple validation with "OK") to security level 2 (validation with an authentication code) will be authorized, but not the opposite. This makes it possible to avoid a complex attack in which a malicious third-party were to steal the mobile terminal 1 of the user, and then modify the security level downward, so as to be able to access a service by spoofing the identity of the user without knowing his authentication code.

To avoid locking the user out, it may be provided, by default, that each online service is associated with the minimum security level, meaning that a priori the user is only able to increase this level. If, after having increased it, he now wishes to reduce it, it may then be provided for example that such a downward modification is performed only in a shop of the operator with presentation of proof of identity.

It should be noted, in any case, that the modification of the security level may be conditional upon the manipulation required by the current security level (or even the higher one out of the initial one and the modified one).

As an alternative or in addition, the provider of a service may require a minimum security level. As the level is minimum by default, it may thus be provided that a service provider himself has the option of upwardly modifying the security level associated with his service for all users. To this end, the method comprises a preliminary step of:

receiving, from the third-party server 4, a request to modify the value of said parameter, comprising the identifier of said given online service and the modified value of said parameter;

replacing, in said base, the value of the parameter, which value is associated with each combination of a unique identifier and of the identifier of said given online service, with said modified value.

Like before, downward modifications, which are potentially fraudulent, may be blocked or in any case conditional upon particular security procedures.

Security Server and Terminal

According to a second aspect, the invention relates to the security server 2 for implementing the method according to the first aspect.

As explained, this security server 2 for providing personal information of a user requested by a given online service is connected to the network 20, and comprises a data processing module 21 implementing:

a module for receiving a request for said personal information of the user, said request comprising a unique identifier of the user and an identifier of said given online service, pairs of a unique identifier and of an identifier of an online service being associated, in a database stored in a data storage module 22 (which may be integrated into the server 2, or just be connected thereto), firstly with personal information and secondly with a parameter representative of a security level required to confirm a response authorization on a mobile terminal 1 of the user;

a module for determining the value of said parameter, which value is associated, in said database, with said unique identifier of the user and identifier of said given online service;

a module for sending, to said mobile terminal 1 of the user, a request to authorize response to said request for said personal information of the user, the determined value of the parameter being integrated into said response authorization request;

a module for sending, in response to the request for said personal information of the user, if there is reception of a response authorization confirmation from said mobile terminal 1, data associated with said unique identifier of the user and identifier of said given online service in said database.

There is also proposed the system comprising the security server 2, and a mobile terminal 1 configured to implement a module for sending, in response to the response authorization request, the response authorization confirmation if the user implements a validation procedure dependent on said value of said parameter.

Computer Program Product

According to a fourth and a fifth aspect, the invention relates to a computer program product comprising code instructions for executing (in particular on the data processing module 21 of the server 2) a method according to the first aspect of the invention for providing personal information of a user requested by a given online service, and storage means able to be read by a computer apparatus (the data storage module 22 of the server 2) on which this computer program product is situated.

The invention claimed is:

1. A method for providing personal information of a user requested by a given online service, the method comprising implementing, by a data processing module of a security server of an operator of a mobile terminal of the user, acts comprising:

a) receiving a request for the personal information of the user, comprising a unique identifier of the user and an identifier of the given online service;

b) sending, to the mobile terminal of the user, a request to authorize response to the request for the personal information of the user;

c) if there is reception of a response authorization confirmation from the mobile terminal, sending, in response to the request for the personal information of the user, data associated with the unique identifier of the user and the identifier of the given online service in a database stored in a data storage module;

wherein a pair of tithe unique identifier of the user and the identifier of the online service is also associated, in the database, with a parameter representative of a security level required to confirm the response authorization on the mobile terminal, a value of the parameter representative of the security level being modifiable and chosen from a predetermined and hierarchized list of security level values, wherein the sending further comprises:
determining the value of the parameter, wherein the value is associated, in the database, with the unique identifier of the user and the identifier of the given online service; and
integrating the determined value of the parameter into the request to authorize response to the request for the personal information of the user; and d) modifying the parameter representative of the security level, comprising:
receiving, from the mobile terminal, a request to modify the value of the parameter, comprising the unique identifier of the user, the identifier of the given online service and a modified value of the parameter; and
replacing, in the database, the value of the parameter, which value is associated with the unique identifier of the user and the identifier of the given online service, with the modified value.

2. The method as claimed in claim 1, wherein the predetermined list comprises at least a first security level in which a manipulation of an interface of the mobile terminal is enough to confirm the response authorization; and a second security level in which it is necessary to input an authentication code on an interface of the mobile terminal to confirm the response authorization.

3. The method as claimed in claim 1, wherein the given online service is hosted by a third-party server connected to the security server via the Internet.

4. The method as claimed in claim 3, wherein the receiving the request for the personal information of the user further comprises a request, by the third-party server to an API platform also connected to the Internet, to provide the personal information of the user, the API platform generating the request for the personal information of the user.

5. The method as claimed in claim 4, wherein the request by the third-party server to the API platform to provide the personal information of the user is sent upon instructions from the user on an apparatus via which the user is seeking to access the online service.

6. The method as claimed in claim 3, comprising preliminary acts of:
receiving, from the third-party server, a request to modify the value of the parameter, comprising the identifier of the given online service and the modified value of the parameter;
replacing, in the database, the value of the parameter, which value is associated with each pair of the unique identifier and of the identifier of the given online service, with the modified value received from the third-party server.

7. The method as claimed in claim 1, wherein the act of replacing is implemented only if the modified value corresponds to a security level higher than the value of the parameter presently associated in the database with the unique identifier of the user and the identifier of the given online service.

8. The method as claimed in claim 1, wherein, after sending the request, the mobile terminal sends, in response to the response authorization request, the response authorization confirmation if the user implements a validation procedure dependent on the value of the ater parameter.

9. A security server for providing personal information of a user requested by a given online service, the user having a mobile terminal of an operator, the security seer comprising:
a processor; and
a non-transitory computer-readable medium comprising instructions stored thereon, which when executed by the processor configure the security server to:
receive a request for the personal information of the user, the request comprising a unique identifier of the user and an identifier of the given online service, wherein the unique identifier of the user and the identifier of the online service are associated, in a database stored in a data storage module, firstly with personal information and secondly with a parameter representative of a security level required to confirm a response authorization on the mobile terminal, a value of the parameter representative of the security level being modifiable and chosen from a predetermined and hierarchized list of security level values;
determine the value of the parameter, which value is associated, in the database, with the unique identifier of the user and the identifier of the given online service;
send, to the mobile terminal of the user, a request to authorize response to the request for the personal information of the user, the determined value of the parameter being integrated into the response authorization request;
send, in response to the request for the personal information of the user, if there is reception of a response authorization confirmation from the mobile terminal, data associated with the unique identifier of the user and the identifier of the given online service in the database; and
modify the parameter representative of the security level, comprising:
receiving, from the mobile terminal, a request to modify the value of the parameter, comprising the unique identifier of the user, the identifier of the given online service and a modified value of the parameter; and
replacing, in the database, the value of the parameter, which value is associated with the unique identifier of the user and identifier of the given online service, with the modified value.

10. A non-transitory computer-readable medium on which is stored a computer program product comprising code instructions for executing a method for providing personal information of a user requested by a given online service, when the code instructions are executed by a processor of a security server of an operator of a mobile terminal of the user, wherein the code instructions configure the security server to perform acts comprising:
a) receiving a request for the personal information of the user, comprising a unique identifier of the user and an identifier of the given online service;

b) sending, to the mobile terminal of the user, a request to authorize response to the request for the personal information of the user;

c) if there is reception of a response authorization confirmation from the mobile terminal, sending, in response to the request for the personal information of the user, data associated with the unique identifier of the user and the identifier of the given online service in a database stored in a data storage module;

wherein a pair of the unique identifier of the user and of the identifier of the online service is also associated, in the database, with a parameter representative of a security level required to confirm the response authorization on the mobile terminal, a value of the parameter representative of the security level being modifiable and chosen from a predetermined and hierarchized list of security level values, and the sending further comprises:
 determining the value of the parameter, wherein the value is associated, in the database, with the unique identifier of the user and the identifier of the given online service; and
 integrating the determined value of the parameter into the request to authorize response to the request for the personal information of the user; and d) modifying the parameter representative of the security level, comprising:
 receiving, from the mobile terminal, a request to modify the value of the parameter, comprising the unique identifier of the user, the identifier of the given online service and a modified value of the parameter; and
 replacing, in the database, the value of the parameter, which value is associated with the unique identifier of the user and the identifier of the given online service, with the modified value.

* * * * *